(12) United States Patent
Moen et al.

(10) Patent No.: US 11,329,326 B2
(45) Date of Patent: *May 10, 2022

(54) POWER SUPPLY SYSTEM

(71) Applicant: Siemens Energy AS, Oslo (NO)

(72) Inventors: Stian Skorstad Moen, Sjetnemarka (NO); Gunnar Snilsberg, Heimdal (NO); Arve Skjetne, Trondheim (NO)

(73) Assignee: SIEMENS ENERGY AS, Oslo (NO)

(*) Notice: Subject to any disclaimer, the term of this patent is extended or adjusted under 35 U.S.C. 154(b) by 257 days.

This patent is subject to a terminal disclaimer.

(21) Appl. No.: 16/496,249

(22) PCT Filed: Mar. 29, 2018

(86) PCT No.: PCT/EP2018/058140
§ 371 (c)(1),
(2) Date: Sep. 20, 2019

(87) PCT Pub. No.: WO2018/184996
PCT Pub. Date: Oct. 11, 2018

(65) Prior Publication Data
US 2020/0091564 A1   Mar. 19, 2020

(30) Foreign Application Priority Data

Apr. 5, 2017 (GB) .................. 1705503
Apr. 5, 2017 (GB) .................. 1705513

(51) Int. Cl.
*H01M 10/42* (2006.01)
*H01M 10/613* (2014.01)
(Continued)

(52) U.S. Cl.
CPC ..... *H01M 10/4257* (2013.01); *H01M 10/482* (2013.01); *H01M 10/486* (2013.01);
(Continued)

(58) Field of Classification Search
CPC .......... H01M 10/4257; H01M 10/613; H01M 10/625; H01M 10/654; H01M 10/6555;
(Continued)

(56) References Cited

U.S. PATENT DOCUMENTS 6,208,117 B1   3/2001 Hibi
2006/0071643 A1   4/2006 Carrier et al.
(Continued)

FOREIGN PATENT DOCUMENTS

EP   2065999 A1   6/2009
EP   2544331 A2   1/2013
(Continued)

OTHER PUBLICATIONS

International search report and written opinion dated Jul. 3, 2018 for corresponding PCT/EP2018/058140.

*Primary Examiner* — Nha T Nguyen

(57) ABSTRACT

A DC energy storage module has a plurality of DC energy storage devices electrically connected in series; an internal control unit in the DC energy storage module; and a power supply for the internal control unit. The power supply for the internal control unit includes one or more of the DC energy storage devices in the module, electrically connected to the internal control unit through a rectifying unit.

24 Claims, 8 Drawing Sheets

(51) Int. Cl.
    *H01M 10/625*     (2014.01)
    *H01M 10/654*     (2014.01)
    *H01M 10/6555*     (2014.01)
    *H01M 10/6557*     (2014.01)
    *H01M 10/6567*     (2014.01)
    *H01M 10/48*     (2006.01)
    *H02J 7/00*     (2006.01)
    *H02J 7/34*     (2006.01)

(52) U.S. Cl.
    CPC ....... *H01M 10/613* (2015.04); *H01M 10/625* (2015.04); *H01M 10/654* (2015.04); *H01M 10/6555* (2015.04); *H01M 10/6557* (2015.04); *H01M 10/6567* (2015.04); *H02J 7/0019* (2013.01); *H02J 7/0047* (2013.01); *H02J 7/34* (2013.01); *H01M 2010/4271* (2013.01); *H01M 2220/20* (2013.01); *H02J 2207/20* (2020.01)

(58) Field of Classification Search
    CPC ......... H01M 10/6557; H01M 10/6567; H01M 10/482; H01M 10/486; H01M 2010/4271; H01M 2220/20; H01M 2010/4278; H02J 7/0019; H02J 7/0047; H02J 7/34; H02J 2207/20; H02J 7/0048; H02J 7/0014; H02J 1/10; H02J 7/0013; Y02E 60/10
    See application file for complete search history.

(56) References Cited

U.S. PATENT DOCUMENTS

| | | | |
|---|---|---|---|
| 2013/0042130 A1* | 2/2013 | Li | H02J 7/0013 713/323 |
| 2013/0122332 A1* | 5/2013 | van Lammeren | H01M 10/48 429/61 |
| 2014/0103876 A1 | 4/2014 | Kim et al. | |
| 2015/0221914 A1* | 8/2015 | Page | H01M 50/394 429/82 |
| 2016/0079788 A1 | 3/2016 | Amasaki et al. | |

FOREIGN PATENT DOCUMENTS

| | | |
|---|---|---|
| EP | 2587618 A2 | 5/2013 |
| WO | 2017197060 A1 | 11/2017 |

\* cited by examiner

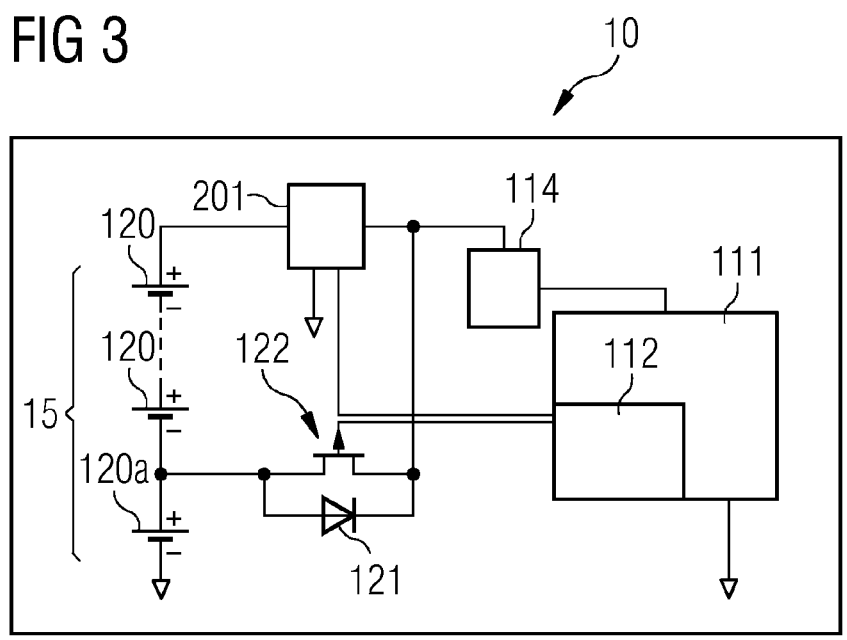

POWER SUPPLY SYSTEM

CROSS REFERENCE TO RELATED APPLICATIONS

This application is the US National Stage of International Application No. PCT/EP2018/058140 filed Mar. 29, 2018, and claims the benefit thereof. The International Application claims the benefit of United Kingdom Application Nos. GB 1705513.8 and GB 1705503.9 both filed Apr. 5, 2017. All of the applications are incorporated by reference herein in their entirety.

FIELD OF INVENTION

This invention relates to an energy storage module and a power supply system for the energy storage module, in particular one comprising electrochemical cells, or batteries, providing electrical energy to an end user.

BACKGROUND OF INVENTION

Stored electrical energy type power units of various types are becoming increasingly common in many applications, in particular for use where there are environmental concerns relating to emissions in sensitive environments, or public health concerns. Stored electrical energy power units are typically used to provide electrical energy to operate equipment, to avoid emissions at the point of use, although that stored energy may have been generated in many different ways. Stored electrical energy may also be used to provide peak shaving in systems otherwise supplied from the grid, or from various types of power generation system, including diesel generators, gas turbines, or renewable energy sources. Aircraft, vehicles, vessels, offshore rigs, or rigs and other powered equipment in remote locations are examples of users of large scale stored electrical energy. Vehicle drivers may use the stored energy power unit in city centres and charge from an internal combustion engine on trunk roads, to reduce the harmful emissions in the towns and cities, or they may charge up from an electricity supply. Ferries which carry out most of their voyage relatively close to inhabited areas, or in sensitive environments are being designed with hybrid, or fully electric drive systems. Ferries may operate with batteries to power the vessel when close to shore, using diesel generators offshore to recharge the batteries. In many Scandinavian countries the availability of electricity from renewable energy sources to use to charge the batteries means that a fully electric vessel is desirable, with no diesel, or other non-renewable energy source. Whether hybrid, or fully electric, the batteries may be charged from a shore supply when docked. The development of battery technology to achieve power units that are reliable enough for prolonged use as the primary power source must address certain technical issues.

SUMMARY OF INVENTION

In accordance with a first aspect of the present invention, a DC energy storage module comprises a plurality of electrochemical energy storage devices electrically connected in series; an internal control unit in the DC energy storage module; and a power supply for the internal control unit; wherein the power supply for the internal control unit comprises one or more of the energy storage devices in the module, electrically connected to the internal control unit through a rectifying unit; and wherein the total voltage of the plurality of energy storage devices in series is greater than 40V DC.

Each module of the energy storage unit is waterproof and substantially gas tight and a plurality of modules may form an energy storage unit, which may be waterproof and substantially gas tight. The use of the energy storage devices within the module to power the internal control unit, in place of an external power supply, allows a module to be manufactured without additional openings to the exterior, which would need to be sealed to prevent egress of gas, or entry of water.

The rectifying unit may comprise a switching component, in particular, one of a diode, a thyristor, a relay, or a bridge rectifier.

The power supply may further comprise a transistor, or relay, in parallel with the rectifying unit.

The internal control unit electronics circuitry may be powered from the full module voltage power supply, but advantageously, the total voltage of the one or more energy storage devices connected to supply the internal control unit does not exceed 24V DC.

The total voltage of the plurality of energy storage devices in series may be in the range of 50V DC to 200 V DC The total voltage of the plurality of energy storage devices in series is advantageously greater than or equal to 100 V DC.

The power supply may further comprise a DC to DC step down converter electrically connected between the internal control unit and the plurality of energy storage devices in series.

Each energy storage module may further comprise at least one of a temperature sensor, a voltage monitoring device, or current monitoring device.

The energy storage module may further comprise a low drop out or wireless switching regulator A wired communication system to a central system controller may be used, such as a controller area network communication system may be used, but to reduce common mode interference, advantageously each energy storage module further comprises a wireless communication system.

The energy storage modules may comprise a sealed fire-resistant casing.

A housing of each energy storage module may at least partially comprises a polymer material.

The polymer material may comprise one of polythene, polyamide, or thermoplastic.

In accordance with a second aspect of the present invention, a DC power supply system comprises a plurality of energy storage modules according to the first aspect; and a common system controller for controlling power availability on a vessel, or offshore platform.

The power supply system voltage may be greater than or equal to 500V DC.

A plurality of power supplies may be connected together to provide a required power supply system voltage.

The common system controller may further comprise a wireless communication system for communicating with each of the energy storage modules.

A method of operating an energy storage module in a DC power supply system according the first aspect may comprise detecting one or more parameters of energy storage devices in the energy storage module; and controlling charging and discharging of the energy storage devices based on the detected parameters.

The central controller may sets and imposes limits on amount and timing of charging and discharging current for the module and energy storage devices within the module.

The parameters may comprise one of temperature, current, or voltage of the one or each energy storage device.

The method may further comprise active balancing of battery capacity of the energy storage devices in response to the detected parameters.

The internal control unit may control active balancing of the energy storage devices in each module, such that the voltage, or state of charge of each energy storage device in the module is maintained at a substantially equal level.

The active balancing may use a full voltage buck converter.

A subset of the voltage is used during low loads and this is balanced out using the full voltage power supply afterwards to increase efficiency.

The method may further comprise sending data, or detected parameters, from each energy storage module to the common system controller.

BRIEF DESCRIPTION OF THE DRAWINGS

An example of power supply system according to the present invention will now be described with reference to the accompany drawings in which:

FIG. 3 illustrates an example of an energy storage module according to the invention, for use in the system of FIG. 1;

DETAILED DESCRIPTION OF INVENTION

Figure 1:
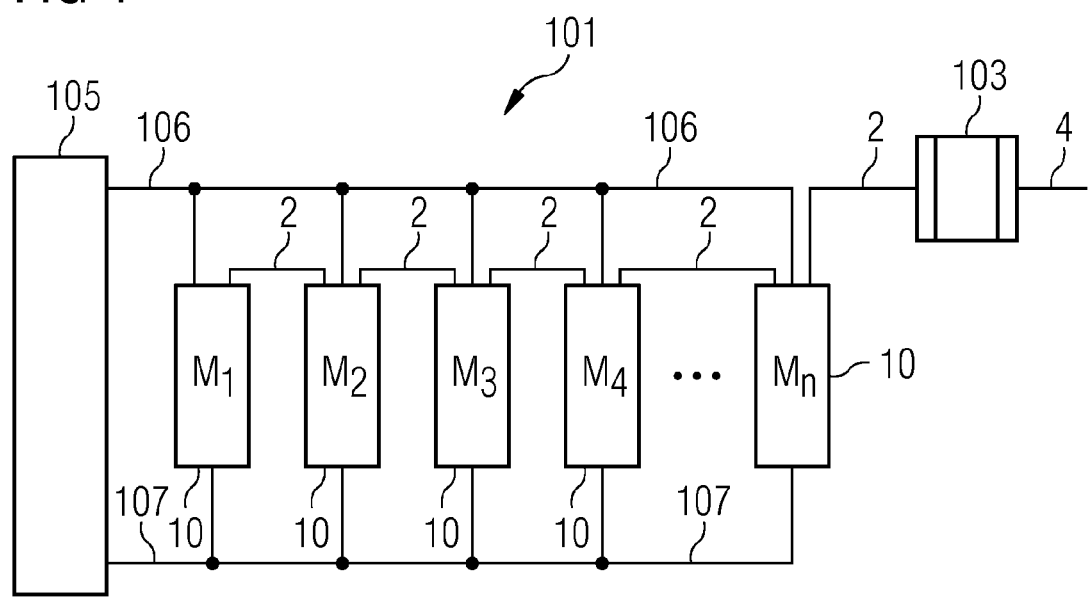
FIG. 1 illustrates an example of a power supply system in which an energy storage module according to the invention may be used.

FIG. 1 illustrates an example of an energy storage system incorporating energy storage modules according to the invention, for all types of applications as described in the introduction, but in particular for use on a vessel or offshore platform, where there are space and weight constraints, as well as safety concerns. The system typically comprises a plurality of energy storage modules $M_1$ to $M_n$, electrically connected together in series by DC bus 2 to provide the voltage level required by the system. Each module of the energy storage system incorporates a plurality of energy storage devices (not shown), electrically connected together in series. An energy storage module 10 typically comprises a stack of one or more energy storage devices (not shown), for example battery cells, each mounted on a cooler 20, which also acts as a support, or carrier for the cells, shown in more detail in FIG. 6 and electrically connected together in series with a neighbouring energy storage device on the next cooler. In the examples, the cooler is an integral part of the support, but an alternative would be to have a separate support frame, or carrier, in which the cooler is mounted. The cells are advantageously prismatic or pouch type cells to get a good packing density. A plurality of energy storage modules may be connected together in series, or parallel, by a DC bus (not shown) to form the energy storage unit, or cubicle 101. A single cell of a module may have a capacity between 20 Ah and 100 Ah, more commonly between 60 Ah and 80 Ah, although cells with a capacity as low as a couple of Ah, or over 100 Ah, may be used. A module typically comprises between 10 and 30 energy storage devices per module 10, although more or fewer cells per module are possible. There may be as many as 50 modules per cubicle, although typically from 9 to 21 modules per cubicle may be chosen, but the precise number may be varied according to the requirement.

Within the energy storage system 101, each module 10 may be connected via the DC bus 2 to a main system DC bus and a central controller 103, which may set limits for example for charging rate and state of charge of each module 10, as well as controlling the supply to consumers (not shown) on the main DC bus 4. The central controller 103 determines which modules 10 to charge or discharge, according to the requirements of the vessel and the available stored energy in each module and controls supply of power to the vessel DC bus 4. There may be a converter (not shown) between each energy storage module and the DC bus 2 of the energy supply system, in particular in the case where there are multiple energy storage modules connected. Although the energy storage devices of the energy storage modules may be cooled by air cooling, advantageously, the energy storage modules are cooled in a closed cooling system comprising a cooling unit 105 supplying cooling fluid in parallel to each module via inlet pipes 106 to each module and receiving cooling fluid returned to be cooled again via outlet pipes 107.

Energy storage systems for supplying DC electrical energy for marine applications, such as systems onboard vessels and offshore platforms, have high voltage and current requirements. They may need to provide voltage levels of 1 KV DC, or higher, which are achieved by combining multiple energy storage modules 10 operating in the range 50V to 200V, depending on cell capacities and physical dimensions, advantageously in the range of 100V to 150 V for each module. It is desirable that each energy storage module has its own control unit comprising local control and monitoring circuitry within the module for such purposes as cell balancing, temperature measurement and cell voltage monitoring. Each local control unit may then provide data to the system power controller 103. However, a typical processor or microcontroller in a circuit for controlling and monitoring the energy storage devices in each module has a voltage requirement of only a few volts DC and a very low current consumption in standby mode. The requirements of the vessels systems and the monitoring circuitry are not compatible, so the control and monitoring circuitry must be powered with an external power source.

Figure 2:
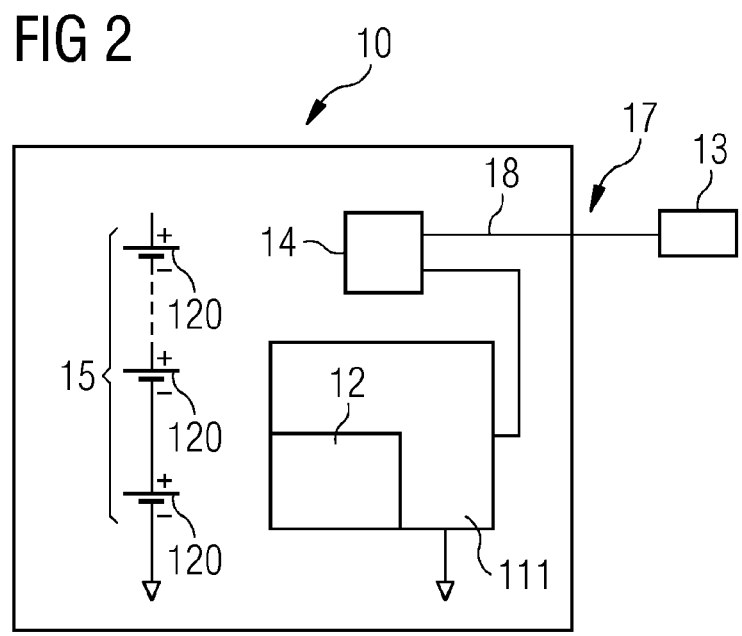
FIG. 2 illustrates an example of a conventional battery module.

FIG. 2 illustrates an example of a module 10 of an energy storage system, incorporating an internal control unit comprising control and monitoring electronics 111 and a processor or microcontroller 12 within the module. Individual energy storage devices, in this example, battery cells, 120 are coupled together in series to produce the required energy storage module voltage 15, in this example, at or about 100V to 150V. Each battery may be rated at, or about, 3V to 4V, for example 3.6V is typical for Li-ion cells. Multiple modules 10 are coupled together as illustrated in FIG. 1 to be able to provide sufficient DC voltage to power the systems on the vessel, such as propulsion systems. For example, using 100V energy storage modules, six to twenty modules may be connected together to give 600V DC to 2 KV DC, according to the system requirements, but scaling up to higher voltages, such as 3 KV or higher, is straightforward, simply by adding additional modules 10 in series. The control and monitoring electronics 111, 12 are powered from an external auxiliary power supply 13 via auxiliary power supply cables 18 which may connect through an optional low drop out (LDO) regulator 14, or other additional regulator between the electronics 111, 12 and the power supply 13. The external power supply is chosen to meet the requirements of the internal control and monitoring electronics 111, 12, rather than the onboard systems powered by the battery system.

The auxiliary power supply cables 18 from the external power source 13 require an opening 17 in the module 10. This is not a particular issue on a land based system, but for offshore installations, which are subject to strict regulations regarding fire safety and waterproofing of each battery module, the need for openings in the module housing makes providing suitable power to the monitoring circuitry is more difficult.

The present invention addresses the problem of powering the internal control unit 111, 12 by supplying energy using the energy storage devices 120 within the module 10, itself. This avoids the need for any additional openings to be made in the module housing that then have to be suitably sealed to meet regulatory requirements. As can be seen in FIG. 3, the energy storage module comprises control and monitoring circuitry 111, including a processor, or microcontroller 112. The circuitry may be connected to an optional LDO regulator, or other additional regulator 114. However, rather than then connecting to an external auxiliary power supply, as in the FIG. 2 example, a circuit is provided within the module 10 to supply the power from one or more of the energy storage devices 120. In this example, the energy storage devices 120 may be cells of a multi-cell lithium ion battery 15, advantageously prismatic, or pouch cells, as these can be efficiently packed to reduce the total space required, compared with cylindrical cells. However, the invention is applicable for other types of energy storage device, such as capacitors—in particular for drilling rigs—super capacitors, lead acid battery cells, fuel cells, or other similar energy storage devices according to the application and power requirement. The number of energy storage devices 120 and the module voltage 10 may be adapted according to the available voltage from the chosen energy storage device type. A typical arrangement is to use sufficient of the energy storage devices in the string to produce a 24V supply for the internal control circuitry.

As previously explained, batteries for industrial applications are typically at a much higher voltage then the battery monitoring, cell balancing electronics requires. Thus, the power supply needs to transforms from the module voltage, typically in the range 100 V DC to 150V DC total battery voltage of each module down to a few volts, typically 3.3V for the CPU 12 and auxiliary electronics of the control and monitoring circuit 111. Another consideration is that in long term storage, or in standby mode, the current consumption of the circuits 111, 112 is kept very low, so as not to drain the battery capacity entirely. Current consumption in these modes may be as low as 200 µA. Traditional power supply configurations are not able to achieve a high efficiency supply from 150V to 3.3V with such a small current consumption.

The energy storage devices 120 of the module 10 comprise a plurality of relatively low voltage cells, connected together to give the relatively high voltage required by the vessel system. Thus, the auxiliary supply to the control and monitoring circuits 111, 112 is provided by one or more of the relatively low power cells, rather than transforming from the full module voltage. By taking energy from only one, or just a few of the energy storage devices 120, the power supply to the circuits 111, 112 does not need to transform the voltage from the module voltage, for example 100V DC, or 150V DC down to the required 3V, or 4V and a simple LDO linear regulator may be used, or other low power switched regulator 114. The internal control unit 111, 112 is referenced to an internal common ground potential and connected to the last of the energy storage devices 120a in the series of energy storage devices 15 through a rectifying unit. The rectifying unit 121, 122 may comprise, for example, a thyristor, relay, bridge rectifier, or diode 121. The rectifying unit may further comprise a semiconductor device, such as a transistor, or a relay, in parallel with the diode, relay, or thyristor. The rectifying unit enables the internal control unit circuitry to be powered from one or a few of the cells in the module. The power supply voltage may be less than, or more than, the voltage of a single cell, so the internal control unit may switch between active balancing and energy consumption, but typically does not exceed 30V DC. In one example, the supply is rated at 24V DC. The parallel combination of diode, relay, bridge rectifier, or thyristor with a semiconductor device such as a transistor or relay enables active balancing of the cell being used. Using a diode, relay, bridge rectifier, or thyristor alone controls the supply to the internal control unit 111, 112, but does not provide the active balancing, as explained in more detail below. Using the energy storage device as a power source for the internal control unit when the module is in storage does not use many cycles and may even use just a fraction of a cycle, so the cell that has been used may be balanced to the other cells before the module is brought into operation, without unduly affecting lifetime of the cell relative to the other cells which were not used.

Simply connecting to a single energy storage device 120a, or only a few devices, out of the 40 or so energy storage devices that make up the energy storage 15 in the module 10 may be sufficient to power the circuitry 111, 112, but for the overall module, it has the disadvantage that the energy storage devices 120, 120a become unbalanced as only one or a few devices are being used to power the circuitry 111, 112, rather than taking a little from each of all the devices 120, 120a and keeping them at a similar level of charge. A further feature of the present invention which addresses this problem is that a semiconductor device, such as a transistor 122, thyristor, or relay, is provided in parallel with the diode 121 and this is connected to a full-voltage DC to DC step down converter, or Buck converter 201, so that the energy storage device 120a being used to supply the internal circuitry 111, 112 may be actively balanced by charging to the correct value through the full-voltage buck converter 201. In active mode, when drawing more current, the main power supply may be used continuously. During power down, or storage mode, when the load is very low, only one cells or a few cells may be needed. Thus, the system may use a combination of the two modes, i.e. a full voltage DC to DC step down converter supply and a supply based on only one cell, or a few cells, to achieve the best efficiency. The CPU 112 has constant power and may choose to activate or deactivate the main buck converter power supply 201 and may choose to charge, or balance the bottom cell 120a at any time.

Active balancing may be done at commissioning, automatically during storage, or both. If active balancing is not used and capacity is simply drained from the bottom cell during storage, then the cells may be passively balanced before use. However, this is less desirable, as it affects the overall capacity and efficiency of the energy storage system.

A power supply using a single energy storage device, or a few such devices, in combination with active cell balancing, increases the efficiency of the complete system dramatically as compared to a system using full voltage buck converter power supply at all times. This enables the multi cell battery module electronics to be powered from within the battery rather than relying on external power. Thus, it is possible to provide data logging during storage of the module 10; a more robust module, as it does not rely on external wires and cable connections for providing power to the internal circuitry 111, 112; and a lower cost product, as there is less cabling work to be done on site and fewer penetrations of the module housing and less wiring required. The present invention is applicable for high efficiency power supplies with wide current range. The systems are more reliable, as each energy storage module has its own power supply, rather than sharing a common external power supply, with the risk of all modules ceasing to provide monitoring and control functions if that external power supply fails.

Figure 4A:
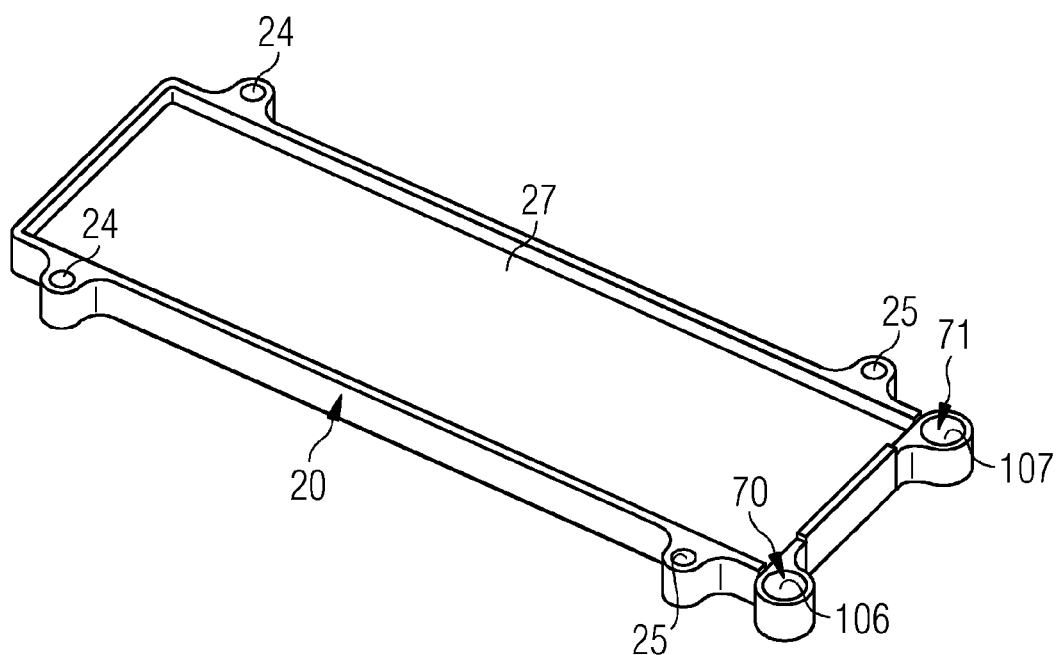
FIGS. 4a and 4b illustrate part of an energy storage module in more detail.
Figure 4B:
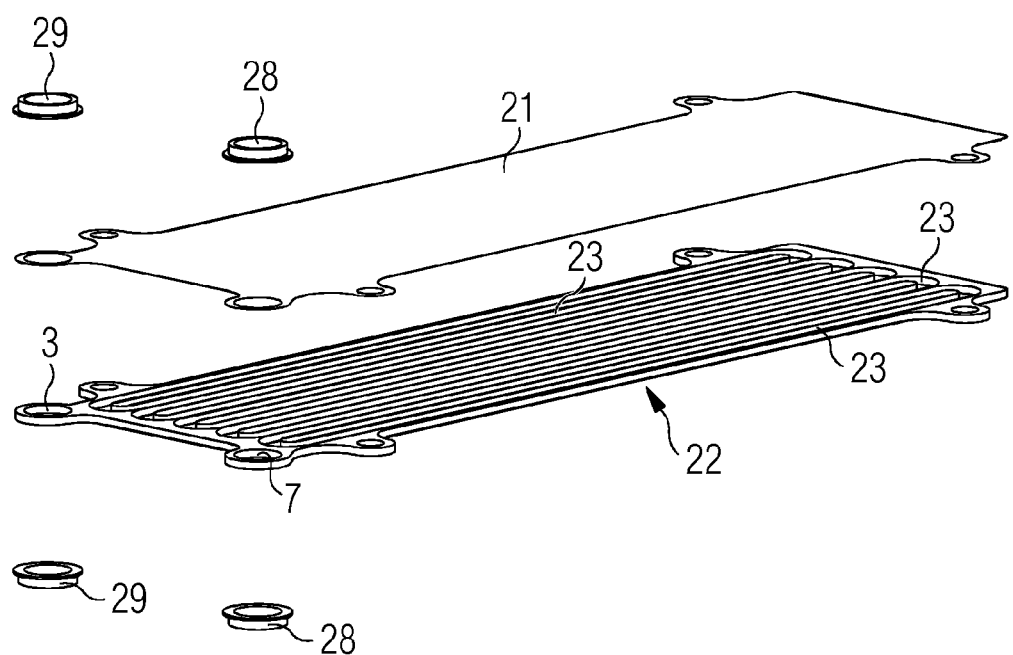
Figure 9:
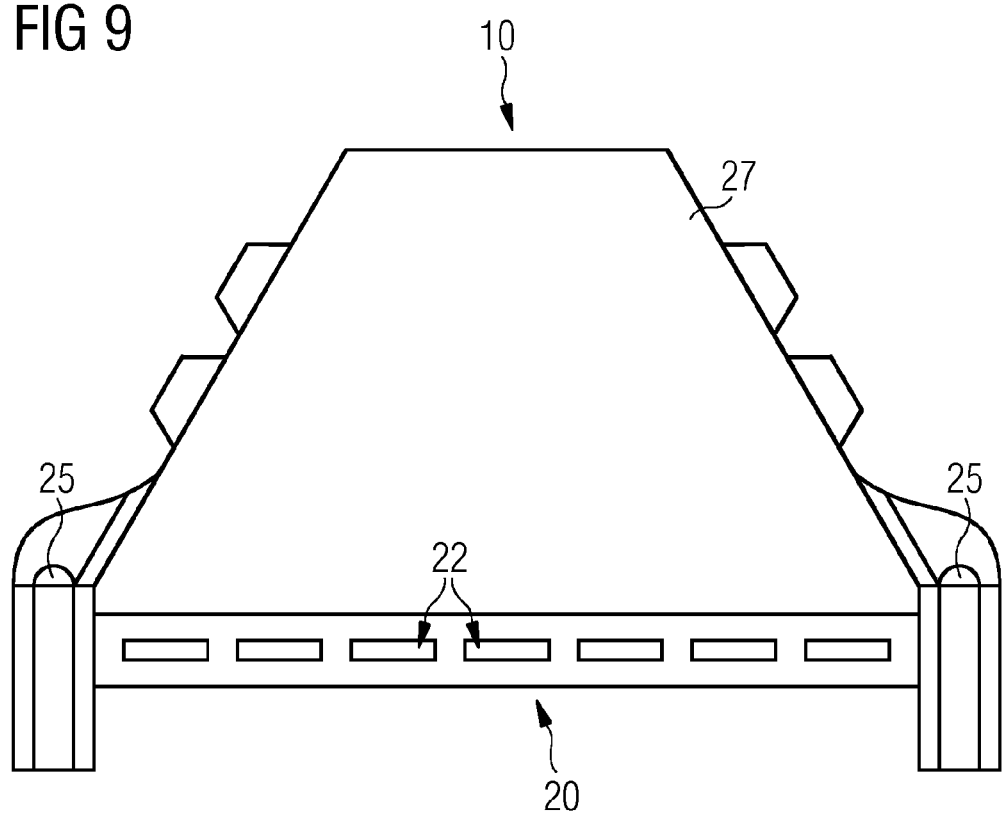

Multiple energy storage units, or cubicles, may be installed on a vessel, or platform, or in any other installation. FIGS. 4a and 4b show different views giving more detail of the modules 10. Each module comprises a cooler 20, as shown in FIGS. 4a and 4b, onto which an energy storage device (not shown), such as a battery cell 120, is fitted. The cooler is typically made from a polymer plastics material for light weight and low cost. As shown in FIG. 4b, an exploded view, cooling channels 22 in the cooler may be formed by laminating, or welding, a plate 21 to a series of raised sections 23 formed, typically by moulding, in another piece of the same polymer plastics material. This forms closed channels, or conduits, through which cooling fluid may flow from one end to another. Alternatively, the cooling channels 22 may be formed as an integral part of the cooler casing by an additive manufacturing, or other, technique, for example as can be seen in the cross section through one module 10, in FIG. 9. A battery cell may be installed in each cooler 20, for example on outer surface 27 of the cooler. The outer surface of the cooler 22 may be in direct contact with one surface of the battery cell to provide effective cooling over a large surface area, without any direct contact of the cooling fluid to the energy storage device, or cell.

Cooling fluid flows from the inlet pipe 106 through the channels, or conduits 23 of the cooler 22, cooling the cell by thermal transfer from the surface of the cell through the thin tubing 23 to the cooling fluid. The cooling fluid channels or tubing have a typical overall thickness in the range of 5 mm to 20 mm, with a wall thickness in the range of 1 mm to 5 mm and advantageously, no more than 3 mm for a polymer plastics material. The cooling fluid is carried away into the outlet pipe 107 and returned to the cooling unit 105 to be cooled again. The tubing 23, formed under plate 21, covers a substantial part of the cell surface on the side that it contacts, anything from 30% to 75% of the cell surface area on that side of the cell.

Figure 5A:
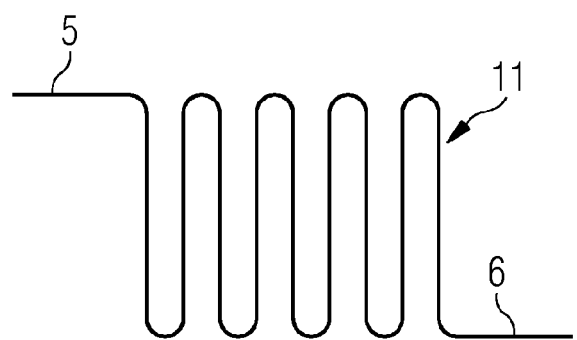
FIGS. 5a and 5b show more detail of coolers which may be used in the examples of FIGS. 4a and 4b.
Figure 5B:
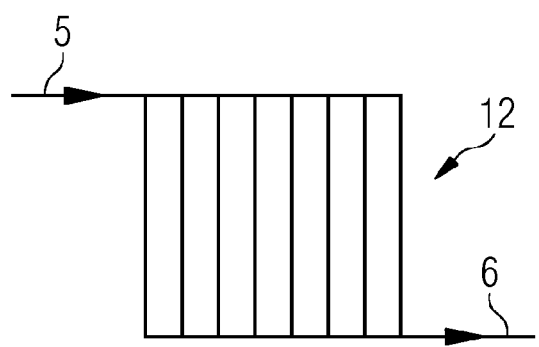

The overall design has a significantly reduced total material weight and cost by using the cooling liquid pipes to flow cooling fluid directly adjacent to the cell surface, instead of conventional cooler block, heat exchanger designs. In addition, this cooling is provided for normal operation, to keep the cell within a temperature range that is beneficial to performance and operational lifetime, rather than as a one off, only in the case of a thermal event. The thin cooling fluid channels 23 may be formed in any suitable form, connected between the inlet and outlet pipes 106, 107 via the tubes 5, 6. Preferably, the cross section of the channels is square to maximise the contact and minimise the amount of plastics material between the cooling fluid and the energy storage device. However, other cross sections could be used, such as circular cross section tubing. The tubing 23 may be in the form of a continuous serpentine 11 connected between the inlet and outlet tubes 5, 6, as shown in FIG. 5a and the example of FIG. 4b, or there may be multiple parallel rows 12 of tubing fed by a common supply from the inlet pipe 106 connected to the inlet tube 5 and exiting through outlet tube 6, as shown in FIG. 5b, to outlet pipe 107.

The tubing 23 may be metal, but more typically is a synthetic material, such as polymer plastics, for example polythene, polyamide, such as PA66 plastics, or thermoplastics such as TCE2, TCE5, or other suitable materials, which may be moulded or extruded, or formed by additive manufacturing techniques to produce the required shape. The tubing material is able to withstand normal operating temperatures of the energy storage modules. An alternative is to form channels walls on a base, for example by moulding, then apply a plate to the upper surface of the walls, which is welded, or laminated, or otherwise fixed in place. The conduits for cooling fluid may have an overall thickness in the range of 5 mm to 20 mm, with a wall thickness in the range of 1 mm to 5 mm, advantageously, no more than 3 mm for a polymer plastics material.

The cell is cooled directly by flowing cooling fluid in the cooling channels over a substantial part of the cell surface, with very little thermal resistance. Conventional cooling arrangements have suffered from hot spots for areas of the cell which were far away from the cooler block, or heat exchanger, but this cooler for each energy storage device avoids this problem. This has the effect of slowing down the aging process of the cell, so increasing its lifetime.

Figure 6:
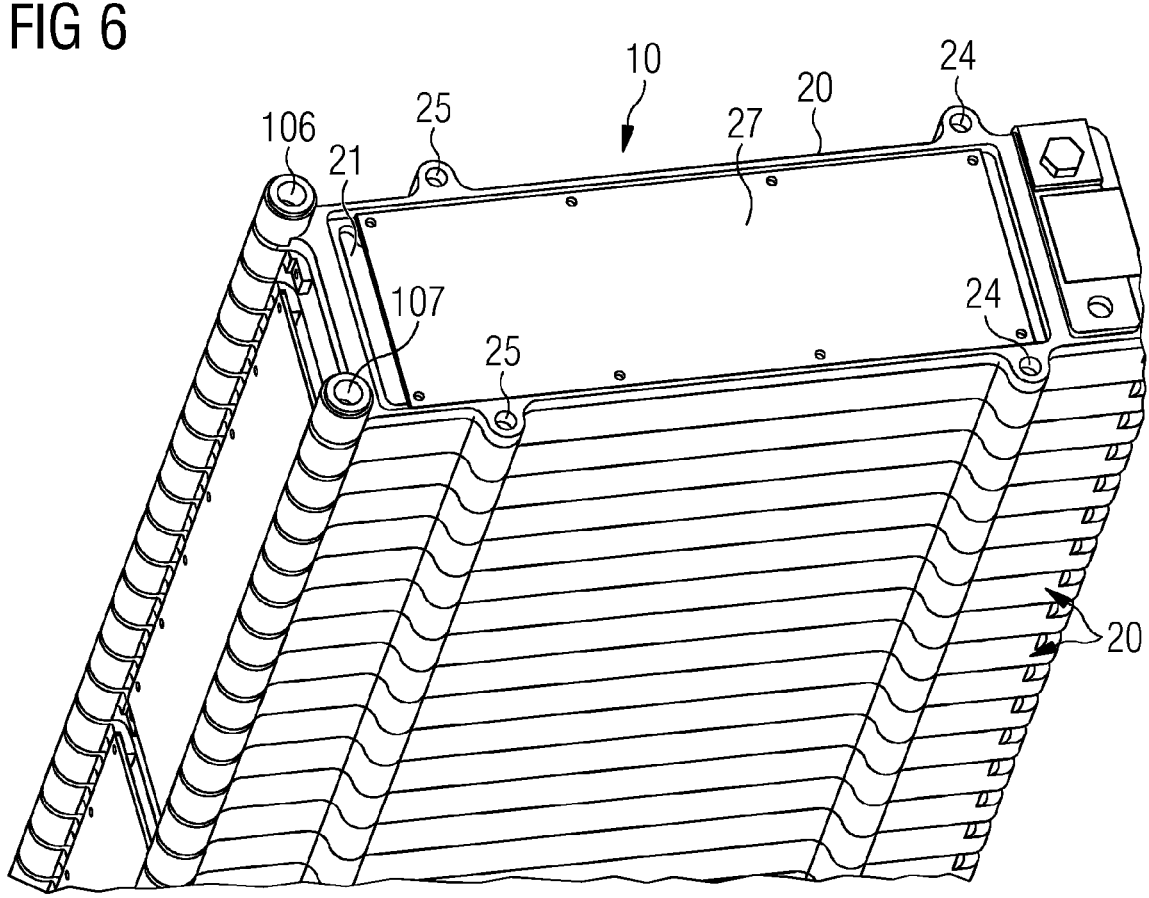
FIG. 6 illustrates how multiple energy storage modules according to the present invention may be stacked together; and, FIG. 7 illustrates more detail of part of the energy storage module.
Figure 7:
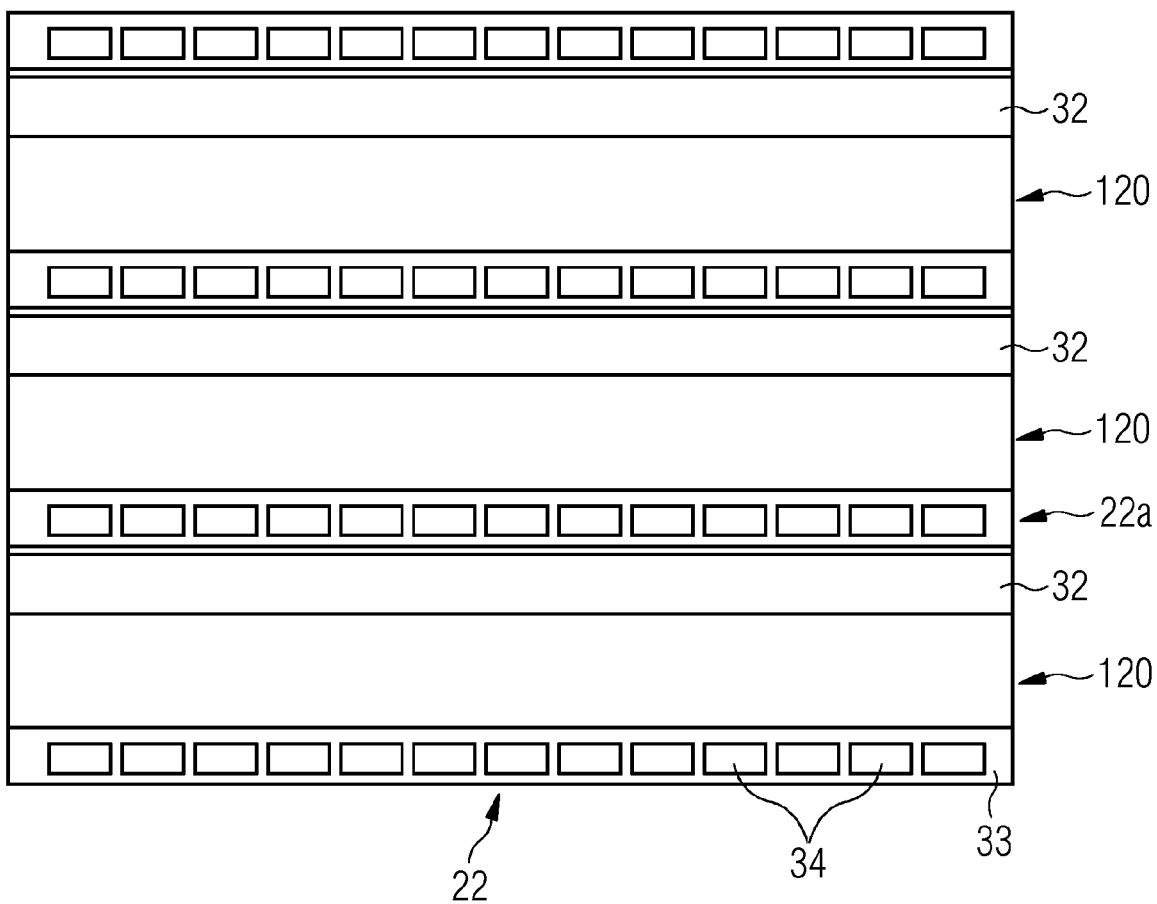

Energy storage modules 10, are formed from a plurality of cells stacked together on their coolers 20, as shown in FIG. 6. Cooling fluid enters the tubes of each cooler from an opening 70 in the common inlet pipe 106 that runs along the stack and exits through an opening 71 in the common outlet pipe 107 that runs along the stack. In a closed system, the cooling fluid is pressurised and circulates around the stack of modules via the common pipes 106, 107 and individual coolers 22 of each module 10. In order to maintain compression of the cell by the cooler 20 to take account of expansion of the cell over time, there needs to be some flexibility to allow for the changes over time. This may be provided by a separate flexible layer 32, as shown in FIG. 7, provided between one surface of the energy storage device 40 and an adjacent cooler 22a. If an insulating layer is used, the insulating layer may perform this function, or with heat transfer controlled by the coolers on either side of the energy storage device, a flexible sheet may be used to ensure that the cooler can still apply pressure. A low pressure is applied, typically below 0.2 bar, on the cell wall to increase performance and lifespan and accept swelling due to normal operation and degradation during the complete life of the cell. A section 33 of the cooler 22 is in direct contact with one surface of the energy storage device 120, the thin walls allowing cooling fluid 34 to cool the energy storage device as the fluid flows through the channels 23. The coolers 20 are mounted on one another and fixed together via fittings, such as bolts in fittings 24, 25. Between each water inlet section 106 and outlet section 107 on each cooler 20, a spacer, or washer 29, 28 may be provided.

An advantage is that the cooler 22 of each energy storage device in the module transfers developed heat directly to the cooling liquid through the whole cell surface, on at least one side of the cell. Stacking the integral cells and coolers as shown in FIG. 6 allows the opposite surface of the cell to be cooled by the cooler of the neighbouring cell in the stack, if a thermally insulating layer is not used on that side. The direct contact of cooler and cell in each module makes the cooling more effective than air cooling, or conductive fins with water cooling, so reducing the temperature difference between cell and coolant in normal operation. The stacking arrangement using one cooler to cool two adjacent cells helps to reduce weight and material cost. Another benefit of the direct contact over the surface of the cell, is that this allows the operating temperature of the cooling liquid to be increased, thereby reducing the likelihood of condensation occurring inside the system. The use of polymer plastics materials for the cooler, rather than metal allows weight and cost to be reduced to a fraction of the conventional solutions. In addition, the modules no longer require a cooler block or heat exchanger, as is required with conventional air or water cooled systems, so the volumetric footprint can be reduced. This is particularly useful for marine and offshore applications, where space is at a premium.

A further feature of the present invention is that, in addition to the thin, lightweight material of the cooling channels between each cell carrying the cooling liquid, allowing effective heat transfer, the cooling system may further comprise sections created in the material of the cooling channels that melt at typical thermal runaway temperatures (i.e. above 170 degrees C.). If a part of the cell is at an elevated temperature, sufficient to cause one or more of these sections to melt, then the cooling system channel has an open point, allowing cooling liquid to come into direct contact with the cell in which thermal runaway is occurring. This additional, active cooling of the cell consumes energy in the burning cell by evaporation of the cooling liquid.

In the event of a section of a cooler melting, due to thermal runaway, or other overheating, forming an opening, there is a large pressure drop, unlike the case in normal operation. As all the coolers of the energy storage modules in the stack are connected in parallel, then cooling liquid from all coolers in the energy storage system flows to the open circuit in the cell suffering a thermal event and exposes that cell to a large amount of cooling liquid, giving a fast reduction in temperature by direct contact of cooling fluid with the overheating cell, to prevent the heat and thermal runaway spreading to neighbouring cells. Actively exposing the critical area to flowing water increases the safety of the energy storage system by very effectively driving the temperature of the cell down. The cooling system is a normally closed system, so the total volume of fluid that goes to cool an overheating cell is limited to the amount that the closed system contains.

A further benefit of this additional feature is that gas and fumes from the cell in which a thermal event is taking place are mixed with water vapour, substantially reducing the flammability of the gas and the gas mixed with water vapour is released to an exhaust system through the battery casing. Mixing the flammable gas with water vapour makes the gas handling in a thermal event less challenging as the flammable gas is mixed with vapour. In addition, there is no need for exhaust cooling and the risk of self-ignition of the hot gas inside the module is substantially reduced, if not removed.

The present invention is described with respect to the example of Li-ion batteries, but is equally applicable to any other type of electrochemical cell based energy storage device, such as alkaline, or nickel-metal hydride (NiMH), or others, as well as to other energy storage technologies, such as capacitors, supercapacitors or ultracapacitors, which may also suffer if the temperature of modules of the stored energy units regularly goes outside an advantageous operating range, reducing the overall lifetime and increasing maintenance costs. For a vessel, or system, relying on stored energy as its primary, or only power source, reliability is particularly important and optimising operating conditions is desirable.

A further feature which may be combined with the present invention is the use of wireless communication from each energy storage module to the system controller 103, so that no additional external connections 2 are needed. This also has the advantage of reducing noise by removing the communication cables, so improving performance and reliability. Alternatively, optical fibre cables may be used in place of wire, although this is a more expensive option, than wireless. Within each module, there may be wired connections to sensors for each cell, but the modules are typically robust and gas tight and it is desirable to avoid penetrating the module. Conventionally, battery modules have used metallic housings, which act as a Faraday cage, making wireless communication impractical. The present invention overcomes this issue by manufacturing at least part of the modules from a non-magnetic material, typically non-metallic, such as a polymer material which allows the transmission of communication signals outside each module of the DC energy storage unit by wireless communication to a controller 128 of the energy storage unit 101.

Figure 8:
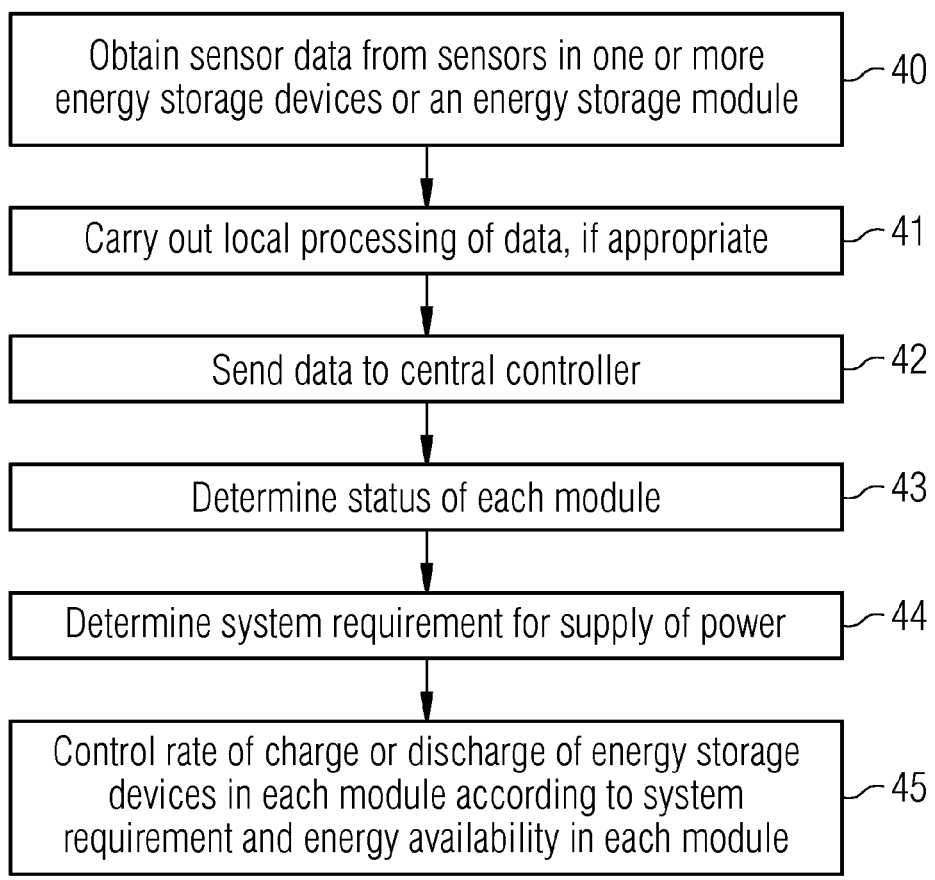
FIG. 8 is a flow diagram of a method of operation of a power supply system according to the invention; and, FIG. 9 shows a cross section through a module according to the present invention.

FIG. 8 is a flow diagram illustrating the main features of a method of operating an energy storage module in a DC power supply system as described herein. One or more parameters relating to the energy storage devices in the energy storage module, or the module itself, are detected 40, typically sensor data from sensors in the devices, or the module. These parameters may comprise, for example, temperature of the device, or of the module enclosure, or current, or voltage, of the, or each energy storage device. Appropriate sensors are provided in the module, or devices, to sense the required parameters. The data, or detected parameters, may be processed locally 41 in the local controller of the module, or sent 42 directly from each energy storage module to the system controller. This central controller uses the sensor data to determine 43 the status of each module. The central controller also receives 44 data relating the system power requirement and the status of other energy storage modules. From the available data, the central controller controls 45 charging and discharging of the energy storage devices. The central controller may set and impose limits on the amount and timing of charge and discharge current for the modules based on the received data. If necessary, the central controller accesses other stored data to use in its determination of the appropriate limits, such as reference values. The internal control unit may carry out active balancing of battery capacity of the energy storage devices in response to the detected parameters, such that the voltage, or state of charge, of each energy storage device in the module is maintained at a level which is substantially equal to the level of the other energy storage devices in that module. The active balancing may use a full voltage buck converter.

The invention claimed is:

1. A DC energy storage module, comprising:
   a plurality of electrochemical energy storage devices electrically connected in series; an internal control unit in the DC energy storage module; and
   a power supply for the internal control unit;
   wherein the power supply for the internal control unit only comprises one or more of the electrochemical energy storage devices in the DC energy storage module, electrically connected to the internal control unit through a rectifying unit; and
   wherein a total voltage of the plurality of energy storage devices in series is greater than 40V DC.

2. The DC energy storage module according to claim 1, wherein the rectifying unit comprises a switching component, a diode, a thyristor, a relay, or a bridge rectifier.

3. The DC energy storage module according to claim 1, wherein the power supply further comprises a semiconductor device, a transistor, or relay, in parallel with the rectifying unit.

4. The DC energy storage module according to claim 1, wherein the total voltage of the one or more energy storage devices connected to supply the internal control unit does not exceed 30 V DC.

5. The DC energy storage module according to claim 1, wherein the total voltage of the plurality of energy storage devices in series is in a range of 50V DC to 200 V DC.

6. The DC energy storage module according to claim 1, wherein the total voltage of the plurality of energy storage devices in series is greater than or equal to 100 V DC.

7. The DC energy storage module according to claim 1, wherein the power supply further comprises a DC to DC step down converter electrically connected between the internal control unit and the plurality of energy storage devices in series.

8. The DC energy storage module according to claim 1, wherein each energy storage module further comprises at least one of a temperature sensor, a voltage monitoring device, or current monitoring device.

9. The DC energy storage module according to claim 1, further comprising:
   a low drop out or wireless switching regulator.

10. The DC energy storage module according to claim 1, wherein each energy storage module further comprises a wireless communication system.

11. The DC energy storage module according to claim 1, wherein a housing of each energy storage module at least partially comprises a polymer material.

12. The DC energy storage module according to claim 11, wherein the polymer material comprises one of polythene, polyamide, or thermoplastic.

13. The DC energy storage module according to claim 1, wherein the DC energy storage modules comprise a sealed fire-resistant casing.

14. A DC power supply system, comprising:
    a plurality of the DC energy storage modules, each energy storage module comprising:
    a plurality of electrochemical energy storage devices electrically connected in series; an internal control unit in the DC energy storage module; and
    a power supply for the internal control unit;
    wherein the power supply for the internal control unit comprises one or more of the electrochemical energy storage devices in the DC energy storage module, electrically connected to the internal control unit through a rectifying unit; and
    wherein a total voltage of the plurality of energy storage devices in series is greater than 40V DC; and
    a common system controller for controlling power availability on a vessel, or offshore platform.

15. The DC power supply system according to claim 14, wherein the power supply system voltage is greater than or equal to 500V DC.

16. The DC power supply system according to claim 14, further comprising:
    a plurality of power supplies connected together to provide a required power supply system voltage.

17. The DC power supply system according to claim 14, wherein the common system controller further comprises a wireless communication system for communicating with each of the DC energy storage modules.

18. A method of operating an energy storage module in a DC power supply system according to claim 14, the method comprising:
    detecting one or more parameters of energy storage devices in the energy storage module; and
    controlling charging and discharging of the energy storage devices based on the detected parameters.

19. The method according to claim 18,
    wherein the common central controller sets and imposes limits on amount and timing of charge and discharge current for the DC energy storage module or for energy storage devices within the DC energy storage module.

20. The method according to claim 18,
    wherein the parameters comprise one of temperature, or current, or voltage of the, or each, energy storage device.

21. The method according to claim 18, further comprising:
    active balancing of capacity of the energy storage devices in response to the detected parameters.

22. The method according to claim 21,
    wherein the internal control unit controls active balancing of the energy storage devices in each module, such that voltage, or state of charge, of each energy storage device in the module is maintained at a substantially equal level.

23. The method according to claim 22, wherein the active balancing uses a full voltage buck converter.

24. The method according to claim 18, further comprising:
    sending data, or detected parameters, from each energy storage module to the common system controller.

* * * * *